United States Patent [19]

Smock

[11] Patent Number: 4,461,064

[45] Date of Patent: Jul. 24, 1984

[54] METHOD OF PROVIDING A CLUTCH BETWEEN A MOTOR DRIVE MEANS AND A CAM PROGRAMMING MEANS

[75] Inventor: Steven W. Smock, Indianapolis, Ind.

[73] Assignee: Emhart Industries, Inc., Indianapolis, Ind.

[21] Appl. No.: 324,857

[22] Filed: Nov. 25, 1981

Related U.S. Application Data

[63] Continuation-in-part of Ser. No. 121,224, Feb. 13, 1980, abandoned.

[51] Int. Cl.³ .............................................. B23P 19/00

[52] U.S. Cl. ........................................ 29/434; 29/458; 29/469; 74/568 T; 464/45

[58] Field of Search .......................... 29/434, 458, 469; 264/249; 464/31, 46, 45, 160; 74/411, 625, 568 T

[56] References Cited

U.S. PATENT DOCUMENTS

| | | | |
|---|---|---|---|
| 240,380 | 4/1881 | Buck | 464/46 X |
| 2,540,854 | 2/1951 | Waestemeyer | 74/411 UX |
| 2,611,284 | 9/1952 | Albee | 74/411 X |
| 2,705,346 | 4/1955 | Schlabach et al. | 264/242 X |
| 2,814,188 | 11/1957 | Fox | 464/45 X |
| 3,186,190 | 6/1965 | Maillot | 464/31 |
| 3,376,714 | 4/1968 | Manoné | 464/46 |
| 3,534,936 | 10/1970 | Knowlton | 264/242 X |
| 3,581,028 | 5/1971 | Valbona | 74/568 T X |
| 3,798,990 | 3/1974 | Knappe et al. | 74/411 |
| 4,022,075 | 5/1977 | Schuder et al. | 74/568 T X |

*Primary Examiner*—Charlie T. Moon
*Attorney, Agent, or Firm*—Robert F. Meyer

[57] ABSTRACT

A clutch particularly adaptable to a timing mechanism comprising a metal member with an aperture in it and an insert molded as a single unit a plastic shaft extending through the aperture and having two plastic clutch discs engaging opposed faces of the rotating member. Flanges extending from the clutch discs connect the discs to cam means of the timing mechanism.

3 Claims, 2 Drawing Figures

METHOD OF PROVIDING A CLUTCH BETWEEN A MOTOR DRIVE MEANS AND A CAM PROGRAMMING MEANS

BACKGROUND OF THE INVENTION

This application is a continuation-in-part of application Ser. No. 121,224 filed Feb. 13, 1980, in the name of Steven W. Smock, now abandoned.

Generally speaking, the present invention relates to a method of providing a clutch for a timing mechanism to permit manual rotation of a cam means independent of a motor drive means, the method comprising providing a rotating member with a central aperture therein; coupling the rotating member to the motor drive means; insert molding with the rotating member as a single unit a shaft extending through the central aperture and a pair of discs extending from the shaft, one each of the discs engaging opposite surfaces of the rotating member, the insert molding providing a tight fit between the shaft and a wall of the central aperture, and a tight fit between the rotating means and the pair of discs; and providing a coupling means coupIng the pair of discs to the programming means; the pair of discs having different coefficients of friction than the rotating member.

The present invention relates to timing mechanisms and more particularly to a timing mechanism which is neat and compact, and which utilizes a clutch means which through its individual compactness and neatness aids in maintaining the overall compactness of the timer.

Timing mechanisms are used in appliances such as washers, dryers, hair dryers, etc. to sequentially operate the appliance in accordance with a programmed sequence. In such mechanisms, cam programming means including cams carried by a shaft actuate electrical switches to provide the program sequence. The cam program means are usually driven through a motor drive means which usually includes a speed reduction means such as a gear train. In some instance, the cam programming means can be manually rotated so that a desired starting point of the program can be manually set. In such instances, clutching means need to be provided so that the cam programming means can be rotated independent of the motor drive.

In applications such as for hair dryers, the timing mechanism needs to be neat and compact with as little protrusions extending from the body of the timers as possible.

OBJECTS OR FEATURES OF THE INVENTION

The present invention is concerned with timing mechanisms and has as one of its objects the provision of a timer which is neat and compact.

Another object of the invention is the provision of a timer which utilizes a clutch means so that the cam programming means may be manually rotated independent of the timer motor drive means.

Still another object of the invention is the provision of a clutch means which includes a rotating member fabricated of a material having a first coefficient of friction and an aperture therein and a shaft extending through the aperture and having clutch discs fabricated of a second material having a different coefficient of friction.

These and other objects of the invention will become apparent from the following description taken in conjunction with the accompanying drawings.

DETAILED DESCRIPTION OF THE INVENTION

Figure 1:
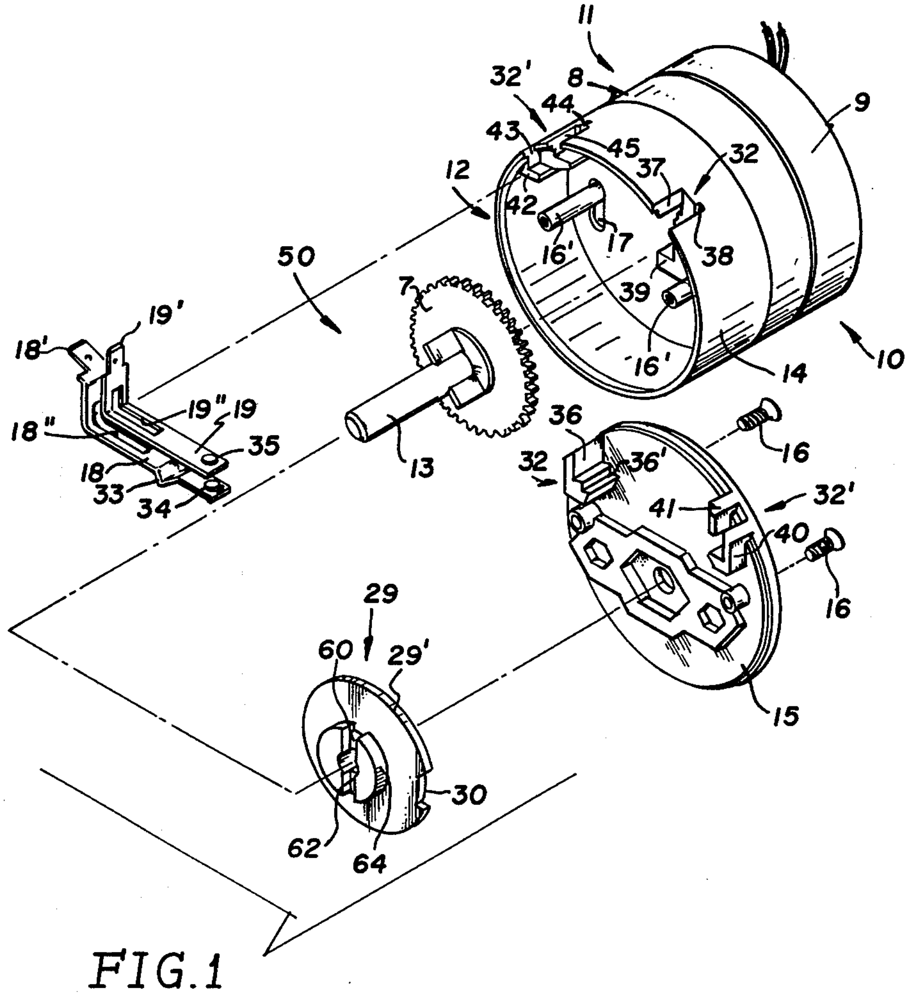
FIG. 1 is an exploded view of a timing mechanism.

Referring now to FIG. 1, there is shown a timing device 10 incorporating the novel features of the present invention. The timer is composed of two sub-assemblies, the motor assembly 11 and the switch timing mechanism 12. The motor assembly includes a synchronous motor 9 and an appropriate geartrain 8 which includes an output pinion (not shown) which engages gear 7 to drive the switch timing mechanism 12 through shaft 13. Gear 7 is independently rotatably carried on shaft 13 through an aperture 13' in the gear. The housing or cover for the switch timing mechanism includes a cup shaped member 14 and a cover plate 15 adapted to close the same. Cover plate 15 is securely fastened to a base plate of the housing for the gear train assembly through a plurality of screws 16 which engage internally threaded posts 16' extending through oblong shaped apertures 17. The cup shaped member 14 and the cover plate 15 are preferably fabricated of an electrically insulating material such as a phenolic plastic, for example.

The essential parts of the switch timing mechanism, in general, comprise the switch contact blades 18 and 19 having electrical terminals 18' and 19' integrally formed as part of the blades, cam programming means 29, and contact blade retaining means 32 and 32' formed as an integral part of the cover 15, and cup shaped member 14. Cam programming means 29 includes at least one cam 29' rotatably carried about shaft 13. Shaft 13 is journalled in the base of cup shaped member 14 and in cover plate 15. For illustrative purposes, there is shown a step 30 provided in the cam, the step being formed in size and contour according to the desired program. As will be hereinafter described, such programming means will, with the proper selection of contact blades 18 and 19, and blade retaining means 32 and 32', allow various switching circuits to be readily obtained, the operation of such circuits being controlled by the timing of the cam programming means 29.

Contact blade 18 is responsive to the cam programming means through the wedge shaped cam follower 33, the follower being formed as an integral part of the blade. Blade 18, being responsive to the cam programming means, is the actuator blade. Movement of the blade 18 causes electrical contact 34 to engage contact 35. Suitable materials for the contact include an electrically conductive material such as copper, for example.

As illustrated in FIG. 1, the timing device of the present invention is adapted to give a single pole, single throw switching circuit arrangement. Cam programming means 29 forces blade 18 to rise when the wedge shaped cam follower 33 rides up and over the discrete arcuate step 30 thus closing contacts 34 and 35. Because of the contact blade retaining means 32 and 32' the blades readily return to their original position when cam follower 33 again reaches arcuate step 30. Blade retaining means 32 includes a stepped blade seating member 36 integrally formed with and extending from cover 15, notches 37 and 38 formed in cup shaped member 14, and L-shaped searing member 39 integrally formed with and extending from cup shaped member 14. Blade retaining means 32' includes an L-shaped seat member 40 and substantially rectangular shaped retaining member 41 both of which are integrally formed with and extending from cover 15, and L-shaped seat 42 and notches 43, 44 and 45 formed in cup shaped member 14.

When the various components of the retaining means are placed in their proper relationship by placing cover 15 over the opening of cup shaped member 14, and when contact blades are inserted in slots formed by the inter-relationship of the parts, the contact blades will be cantilevered at one end with their other ends being free to bend in accordance with the actuation induced by cam programming means 29. When the arcuate step 30 of the cam programming means again reaches the cam follower 33, blade 18 will return to the position shown, with blade 19 being stopped at the step 36' of stepped support member 36, thus breaking the electrical contact between contacts 34 and 35. Contact blades 18 and 19 preferably include elongated apertures 18" and 19" which extend beyond the bend of the blades so that the blades can be more easily deflected for a given thickness of blade.

Figure 2:
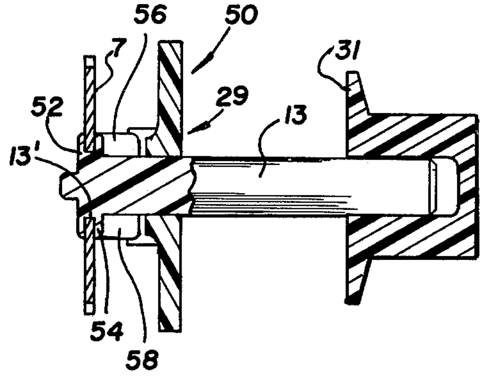
FIG. 2 is an enlarged view showing the cooperating elements of a clutch means used in the timer.

Shaft 13 can be either motor driven or can be manually rotated through a knob 31 so that a desired setting, such as the program starting point, may be manually set. In order that the manual rotation may be independent of the motor drive means, a clutch means 50 is provided. Referring to FIGS. 1 and 2 clutch means 50 includes gear 7 and a pair of clutch discs 52 and 54. Extending from discs 54 is a pair of oppositely disposed flanges 56 and 58 which engage corresponding slots 60 and 62 provided in hub 64 of cam programming means 29 to couple the discs thereto.

As will become apparent hereinafter, the clutching action arises from the difference in coefficient of friction between gear 7 and discs 52 and 54. That is, there must be sufficient friction between the gear and the discs so that the discs will rotate in accordance with the rotation of the gear when power driven rotation is applied to the gear and yet permit the discs to be manually rotated independent of the gear. For the timer just described, it has been found that a difference of friction sufficient to require about 15 inch—oz of torque to override the gear is satisfactory. In the present embodiment, this has been achieved by fabricating gear 7 of steel and the discs of a thermoplastic acetal copolymer plastic, each with a relatively smooth finish. The discs are insert molded with the gear and as a single piece with shaft 13 and flanges 56 and 58. This assures tight fit between the gear and the discs.

In operation, when power driven rotation is applied to gear 7, the friction between the gear and discs 52 and 54 will cause the discs and shaft 13 to rotate and cam 29' will be driven through flanges 56 and 58 engaging notches 60 and 62 of the cam. When it is desired to manually set the cam, shaft 13 is manually rotated to rotate the cam through flanges 56 and 58 engaging slots 60 and 62 while discs 52 and 54 overcome the friction between them and gear 7 to override the gear.

What is claimed is:

1. A method of providing a clutch between a motor drive means and a cam programming means of a timer wherein electrical switch means are responsive to rotation of said cam programming means, said cam programming means responsive to both manual drive means and said motor drive means; the method comprising providing a rotating member with a central aperture therein; coupling said rotating member to said motor drive means; insert molding with said rotating member as a single unit a shaft extending through said central aperture and a pair of discs extending radially from said shaft, one side of each of said discs engaging opposite surfaces of said rotating member and the opposite side of one of said disc being molded with a coupling element thereon, said insert molding providing a tight manually overcomeable fit between said shaft and a wall of said central aperture, and a tight manually overcomeable fit between said rotating member and said pair of discs; assembling a coupling element of said cam programming means on said shaft in engageable relationship to said coupling element of said one disc, and coupling said pair of discs to said programming means; said pair of discs having different coefficients of friction than said rotating member whereby said motor drive means will frictionally drive said shaft and said cam programming means thereon by friction between said rotating member and said discs, and said cam programming means being manually rotatable relative to said rotating member by overcoming the friction between the discs and the rotating member.

2. A method according to claim 1 wherein said coupling means includes at least one flange extending from at least one of said discs and insert molded therewith and engaging a slot provided in said cam programming means.

3. A method according to claim 1 wherein said rotating member is a gear fabricated of steel and said single unit is fabricated from a plastic.

* * * * *